March 22, 1960    J. M. WILLIAMS, JR., ET AL    2,929,111
ROLLER COTTON GIN

Filed May 7, 1958    2 Sheets-Sheet 1

INVENTORS
JAMES M. WILLIAMS Jr.
HENRY T. MONTGOMERY

BY
*J. A. Seequest*
ATTORNEY

March 22, 1960  J. M. WILLIAMS, JR., ET AL  2,929,111
ROLLER COTTON GIN

Filed May 7, 1958  2 Sheets-Sheet 2

INVENTORS
JAMES M. WILLIAMS Jr.
HENRY T. MONTGOMERY

BY
ATTORNEY

2,929,111

ROLLER COTTON GIN

James M. Williams, Jr., State College, and Henry T. Montgomery, Mesilla Park, N. Mex.

Application May 7, 1958, Serial No. 733,774

4 Claims. (Cl. 19—50)

(Granted under Title 35, U.S. Code (1952), sec. 266)

A non-exclusive, irrevocable, royalty free license in the invention herein described, throughout the world for all purposes of the United States Government, with the power to grant sublicenses for such purposes, is hereby granted to the Government of the United States of America.

The patent rights for the United States in any invention in the patent to be granted on this application are dedicated to the public.

This invention relates to a cotton gin and has among its objects a roller type gin of simple construction, of high capacity per unit length of the roller, and of high efficiency from the standpoints of degree of separation of seed from the lint, quality of the lint, little seed damage, and low power requirements.

For a detailed description of the gin, reference is made to the accompanying drawing in which:

Fig. 5 is a schematic detail to illustrate operational characteristics.

Figure 1:
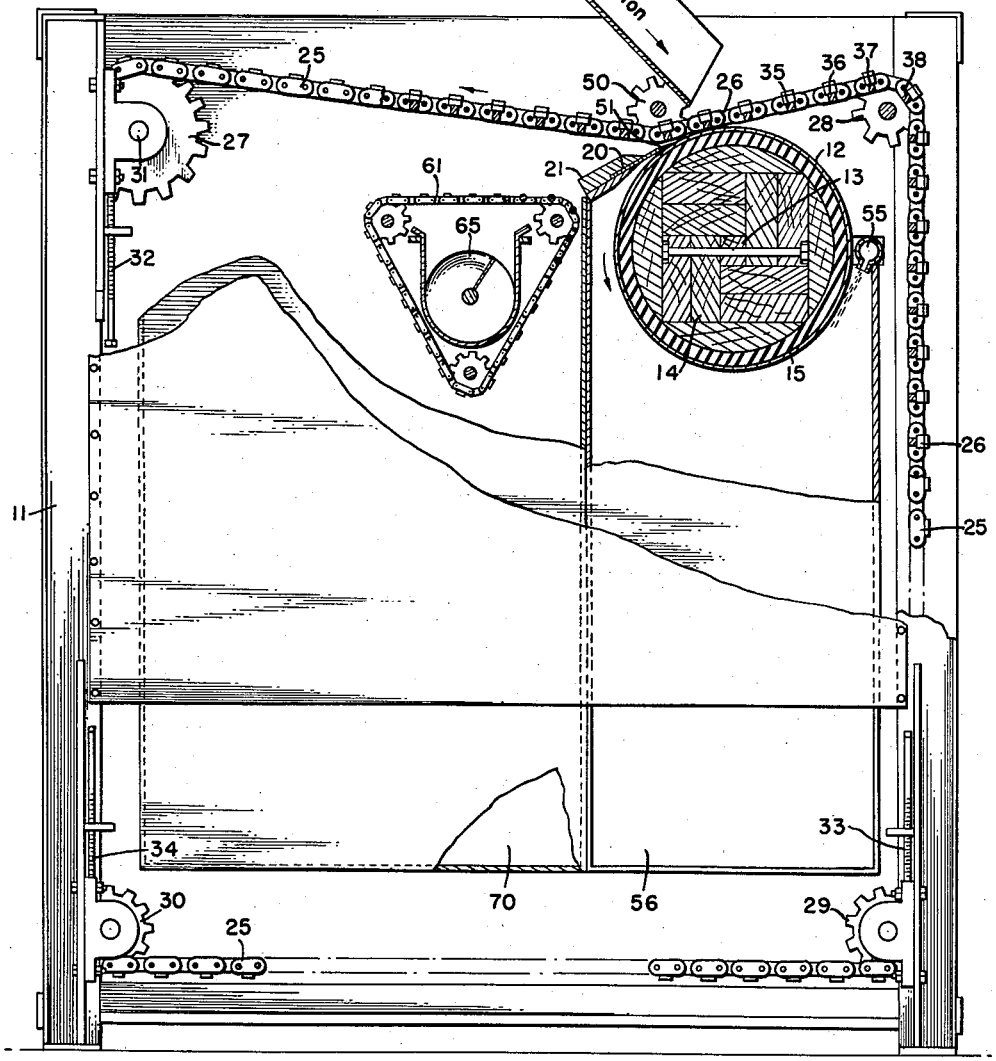
Fig. 1 is a side elevation of the gin with part of the side panel broken away to show internal structures and with the upper righthand portion of the gin shown in longitudinal section.

The several parts of the gin are mounted on the stationary frame 11. The horizontally extending ginning roller 12, of a usual construction, is provided with a roller shaft 13, body portion 14, and surface covering 15 to which lint fibers adhere. Shaft 13 is rotatably mounted to the frame by bearings at the ends of the roller. The roller is power driven in the direction indicated in the drawing by any suitable means such as a drive pulley (not shown) fixed to the outside end of shaft 13 at either side of the gin.

A stationary knife 20 is mounted on a cross rail 21 fixed at its ends to the frame. Knife 20 performs the usual function in gins of the roller type. It is so positioned relative to the roller that the seed cotton to be ginned is fed from feed chute 22 by gravity onto the top of the roller at a position slightly in advance of the stationary knife so that the seed cotton adheres to the surface of the roller and is dragged toward the knife.

Endless chains 25 and 26 of a roller type, one chain at each side of the gin, are suitably looped over sprockets such as 27, 28, 29, and 30 rotatably mounted on the frame. The sprockets at the upper lefthand corner as viewed in Fig. 1 (sprocket 27 for example) are fixed to a common sprocket shaft 31 rotatably mounted in suitable bearings and power driven in any desired manner, such as by a pulley (not shown) fixed to the end of the shaft, outside the gin, to move the chains in unison in the direction indicated in the drawing.

Sprocket 27 and the corresponding sprocket at the opposite end of the sprocket shaft are vertically adjustable by means of adjusting bolts as illustrated at 32 for purposes later described. Sprocket 29 and 30 and the corresponding sprockets at the opposite side of the gin are also adjustable by means of bolts as at 33 and 34 for chain tightening purposes.

A set of double edge elongated horizontal extending moving knives, such as shown at 35, 36, 37, 38, etc. in the form of straight rectangular bars, lie parallel to the surface of the roller. Each bar is fixed at each of its ends to the side chain at that end in the manner illustrated in Fig. 4. The side chains are so positioned that the double edge knives are caused to move linearly over the roller 12 in engagement with it in single file, and thence over the stationary knife 20. The double edge knives are spaced sufficiently far apart to permit the seed cotton to be deposited onto the roller between the movable knives.

Figure 2:
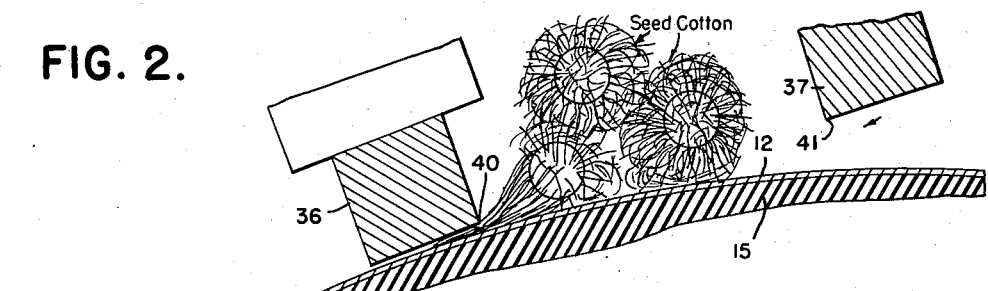
Fig. 2 is an enlarged detail to illustrate operational characteristics.
Figure 3:
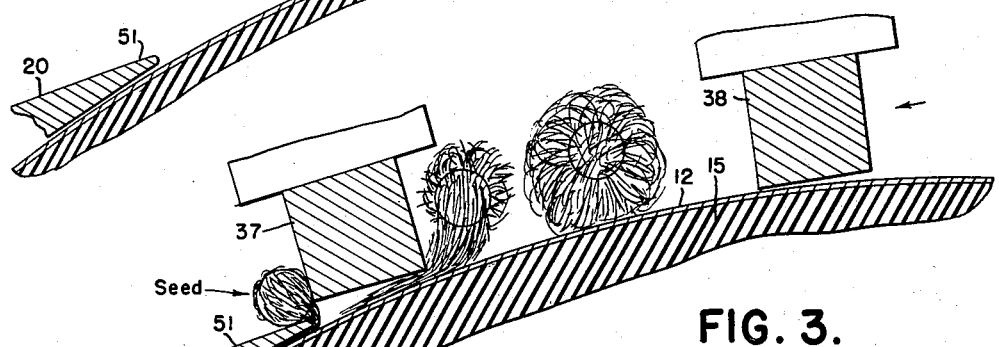
Fig. 3 is a similar enlarged detail to illustrate further operational characteristics.

The surface speed of the roller is somewhat faster than the speed of the moving knives. The result is that as a lock of cotton bearing a seed is carried forward by the roller, the fibers are dragged under the moving knife immediately forward of the lock. The seed is thereby brought into contact with the rearward edge, such as edge 40 of knife 36 as illustrated in Fig. 2, the rearward edge restraining the seed. The dragging forward of the fibers faster than the seed is permitted to move, results in at least a partial ginning of the cotton at this point. The moving knife then passes over the stationary knife and the seed is released. If it is not completely separated from the cotton, the seed engages the edge of the stationary knife and the forward edge 41 of the next approaching knife (37 as in Fig. 2) engages the seed and propels it over the stationary knife (see Fig. 3) thus furthering or completing the ginning, the fiber being carried forward under the stationary knife by the roller.

Figure 4:
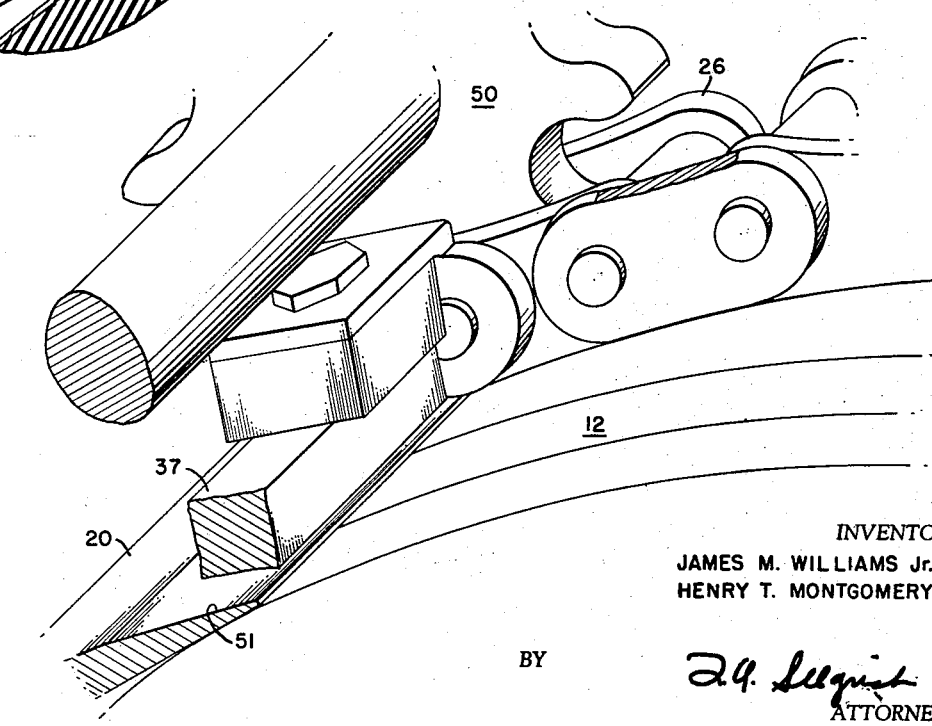
Fig. 4 shows an enlarged detail of structures in three dimension.

The double edge moving knives are constrained to move in a fixed pattern relative to the stationary knife by virtue of two guide means such as restraining sprockets rotatably mounted on the frame, one for each side chain. Constraining sprocket 50, for example, engages the upper portion of chain 26 as illustrated in Fig. 4, the sprocket being positioned immediately above the flat upper surface 51 of the stationary knife. Due to the fact that the constraining sprocket causes the moving knives to follow a circular path at this point and to the fact that surface 51 is flat, the moving knife is first close to the edge of the stationary knife and then recedes from it (see Fig. 5 for example). The purpose of such structure and operation is to permit the seed to escape under the moving knife. If the seed has not yet been fully separated from the fiber it will escape the moving knife and be dragged back by the clinging fiber until it is again adjacent to the edge of the stationary knife. The forward edge of the next approaching moving knife then engages the seed and completes the separation.

The ginned fibers adhering to the surface of the ginning roller are carried on and are doffed from it by an air blast doffer 55 into fiber chute 56.

The separated seeds and any unginned cotton, that is cotton that failed to adhere to the surface of the ginning roller, are transferred on to a screen which may be in the form of a lattice type movable conveyor 61. The separated seeds fall through the lattice type conveyor into a screw type conveyor 65 and are conveyed to any desired location, while the unginned cotton and any adhering ginned seed are deposited into reclaiming chute 70 for reclaiming and further ginning purposes.

The dimensional characteristics of the gin are subject to wide variations. Noteworthy results, especially relative to gin capacity per unit length of the ginning roller, have been obtained using a 12.5-inch diameter ginning roller with a surface speed of from about 1.2 to 2.8 times that of the moving knives. (Moving knife speed of about from 2,000 to 8,000 inches per minute.) The rearward and forward edges of each knife may be spaced apart about from 0.5 to 1.0 inch (fabricated from 0.5 to 1.0 inch square stock, for example) and the adjacent knives may be spaced apart about from 1.5 to 4.0 inches (on centers). Provisions to allow the escapement of seed, beyond the leading edge of the stationary knife at a distance of approximately one-half the length of the staple being ginned, is made by the adjustment of angle between the flat surface 51 and the direction of movement of the moving knives over the surface (angle $x$ in Fig. 5). This angle may be varied by altering the thickness and slope of the stationary knife 20, the size and location of sprocket 50, or the vertical adjustment of sprocket 27.

A particular gin was developed at the Southwestern Cotton Ginning Research Laboratory, U.S. Dept. of Agriculture, Mesilla Park, New Mexico, using a 12.5-inch ginning roller with surface speed ranging from 2,000 to 8,000 inches per minute and moving knife speed ranging from 1,000 to 4,000 inches per minute. This gin produced about 18 pounds of ginned lint per hour per inch of roller length.

We claim:

1. A cotton gin comprising a horizontally extending ginning roller having a surface to which fibers adhere, means for feeding seed cotton onto the top of the ginning roller, a stationary knife so positioned relative to the ginning roller that the seed cotton is fed onto the ginning roller at a position slightly in advance of the stationary knife, the seed cotton adhering to the surface of the ginning roller being dragged toward the stationary knife, a set of elongated horizontally extending moving knives parallel to the surface of the ginning roller and spaced sufficiently far apart to permit the seed cotton to be deposited onto the ginning roller between them, and means for moving the moving knives linearly over the ginning roller in engagement with its upper portion in single file and thence over the stationary knife.

2. The cotton gin of claim 1 characterized in that the surface speed of the ginning roller is faster than the linear speed of the moving knives, and in that the moving knives are each provided with a rearward edge and a forward edge, whereby the seed cotton is at least partially ginned by virtue of the fibers adhering to the ginning roller dragging under the moving knife while the rearward edge of the knife restrains the seeds, the moving knife then passing over the stationary knife and releasing the seed, the forward edge of the approaching moving knife engaging the seed and propelling it over the stationary knife to further or to complete the ginning.

3. A cotton gin comprising a frame, a horizontally extending ginning roller mounted on this frame and having a surface to which fibers adhere, means for feeding seed cotton onto the top of the ginning roller, a stationary knife mounted on the frame and so positioned relative to the ginning roller that the seed cotton is fed onto the ginning roller at a position slightly in advance of the stationary knife, the seed cotton adhering to the surface of the ginning roller being dragged toward the stationary knife, a set of moving knives spaced sufficiently far apart to permit the seed cotton to be deposited onto the ginning roller between them, an endless roller type chain at each side of the gin looped over sprockets rotatably mounted on the frame, the moving knives being fixed to the endless chains so that they move linearly over the ginning roller in engagement with its upper portion in single file as the sprockets are rotated, the stationary knife having a flat upper surface over which the moving knives pass, and a guide means for each side chain mounted on the frame immediately above the flat upper surface of the stationary knife, the guide means constraining the moving knives to move in a fixed pattern such that a moving knife is first close to the edge of the stationary knife and then recedes from it, thereby to permit the seed to escape under the moving knife, and if the seed is not fully separated from the fibers the seed will be dragged back by the clinging fibers until it is again adjacent to the edge of the stationary knife and will be engaged by the next approaching moving knife to complete the separation.

4. The cotton gin of claim 3 characterized in that the surface speed of the ginning roller is faster than the linear speed of the moving knives, and in that the moving knives are each provided with a rearward edge and a forward edge, whereby the seed cotton is at least partially ginned by virtue of the fibers adhering to the ginning roller dragging under the moving knife while the rearward edge of the knife restrains the seeds, the moving knife then passing over the stationary knife and releasing the seed, the forward edge of the approaching moving knife engaging the seed and propelling it over the stationary knife to further or to complete the ginning, and a means for reclaiming and ginning any portions of residual seed cotton which had escaped ginning in previous passage.

References Cited in the file of this patent

UNITED STATES PATENTS

| Re. 12,042 | McPherson | Oct. 7, 1902 |
| --- | --- | --- |
| | (Original No. 701,814, June 3, 1902) | |
| 633,994 | Graves | Oct. 3, 1899 |

FOREIGN PATENTS

| 357,720 | Great Britain | Oct. 1, 1931 |
| --- | --- | --- |